US008776234B2

(12) United States Patent
Doukhvalov (10) Patent No.: US 8,776,234 B2
(45) Date of Patent: Jul. 8, 2014

(54) SYSTEM AND METHOD FOR DYNAMIC GENERATION OF ANTI-VIRUS DATABASES

(75) Inventor: Andrey P. Doukhvalov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 313 days.

(21) Appl. No.: 13/090,853

(22) Filed: Apr. 20, 2011

(65) Prior Publication Data

US 2012/0272318 A1 Oct. 25, 2012

(51) Int. Cl.
*G06F 11/00* (2006.01)
*G06F 21/57* (2013.01)

(52) U.S. Cl.
CPC ........ *G06F 21/57* (2013.01); *G06F 2221/2111* (2013.01)
USPC .......... 726/24; 726/3; 726/6; 726/13; 726/23; 713/187; 713/188; 713/191; 709/219; 370/235; 370/352; 370/394

(58) Field of Classification Search
CPC ...................................................... G06F 21/57
USPC .......... 726/22–33, 3, 6, 13; 713/38, 187–188, 713/191; 709/220–223, 219; 370/235, 352, 370/394
See application file for complete search history.

(56) References Cited

U.S. PATENT DOCUMENTS

| | | | | |
|---|---|---|---|---|
| 6,269,456 | B1 * | 7/2001 | Hodges et al. | 714/38.1 |
| 7,080,000 | B1 * | 7/2006 | Cambridge | 703/21 |
| 7,310,815 | B2 * | 12/2007 | Yanovsky | 726/13 |
| 7,600,257 | B2 * | 10/2009 | Dubrovsky et al. | 726/23 |
| 7,738,380 | B1 * | 6/2010 | Dubrovsky et al. | 370/235 |
| 7,835,361 | B1 * | 11/2010 | Dubrovsky et al. | 370/394 |
| 2004/0003266 | A1 * | 1/2004 | Moshir et al. | 713/191 |
| 2008/0214171 | A1 * | 9/2008 | An | 455/418 |
| 2008/0247382 | A1 * | 10/2008 | Verma et al. | 370/352 |
| 2010/0005520 | A1 * | 1/2010 | Abbot et al. | 726/6 |
| 2010/0132042 | A1 * | 5/2010 | Zhang | 726/24 |
| 2010/0138899 | A1 * | 6/2010 | Yamamoto et al. | 726/3 |
| 2010/0274875 | A1 * | 10/2010 | Banno et al. | 709/219 |
| 2013/0016801 | A1 * | 1/2013 | Xia et al. | 375/354 |

FOREIGN PATENT DOCUMENTS

EP 1330097 7/2003

OTHER PUBLICATIONS

Paul Roberts, In search of security event standards, Nov. 4, 2004, Computer World, 1 Page.*
Essam Al Daoud et al., Computer Virus Strategies and Detection Methods, Sep. 2008, Int. J. Open Problems Compt. Math.,vol. 1, No. 2, 8 Pages.*

(Continued)

*Primary Examiner* — Luu Pham
*Assistant Examiner* — Fahimeh Mohammadi
(74) *Attorney, Agent, or Firm* — Bardmesser Law Group (57) ABSTRACT

A method for reducing the size of the AV database on a user computer by dynamically generating an AV database according to user parameters is provided. Critical user parameters that affect the content of the AV database required for this user are determined. The AV database for the single user is generated based on the user parameters. When the parameters of the user computer change or when new malware threats are detected, the user AV database is dynamically updated according to the new parameters and the new malware threats. The update procedure becomes more efficient since a need of updating large volumes of data is eliminated. The AV system, working with a small AV database, finds malware objects more efficiently and uses less of computer system resources.

16 Claims, 6 Drawing Sheets

(56) References Cited

OTHER PUBLICATIONS

Akbar Badhusha et al., Automatic Signature files update in Antivirus software using Active Packets, Jun. 2001, IEEE, 457-460 Pages.*

Johannes Kinder et al., Proactive Detection of Computer Worms Using Model Checking, Oct.-Dec. 2010, IEEE, vol. 7, No. 4, 424-438 Pages.*

Search report in EP 11171616 dated Oct. 16, 2012.

* cited by examiner

SYSTEM AND METHOD FOR DYNAMIC GENERATION OF ANTI-VIRUS DATABASES

BACKGROUND OF THE INVENTION

1. Field of the Invention

The present invention is related to methods for anti-virus (AV) protection and, in particular, to a method and system for dynamic generation of AV databases based on parameters of a user computer.

2. Description of the Related Art

Security of data located on user PCs, mobile devices or within enterprise systems is a problem that only becomes more complex every day. A large number of new malware applications appear practically every day. Each of these malware applications can cause computer failures or result in a loss or theft of critical personal user data. Many of the known malware applications are modified so they become harder to detect.

In order to maintain a necessary level of data security, vendors of AV systems have to constantly update their AV databases that are used for virus or malware detection. Modern AV databases contain various types of data: malware signatures (including heuristic signatures), blacklists of malicious object checksums, blacklists of web sites, executable codes of data unpacking algorithms and codes of heuristic data analysis, data for dealing with detected threats, etc.

In addition to these types of data, the AV databases can contain a code needed for updating components of the AV system. Thus, the AV databases are not only used for keeping the current signatures, but for updating the actual AV system. Data contained in the AV databases can be represented differently based on the AV system that uses them. The format and representation of the data are selected based on criteria such as, for example, simplicity of update, convenience of use, size, etc.

The data can be represented as a plurality of files of different formats, for example, as a dynamic link library (DLL), as XML files, or as proprietary formats used by a particular AV system. Currently, typical AV databases contain large volumes of various data that constantly increases in volume. This is caused by new malware appearing every day and corresponding data being inserted into the AV database. The ever-increasing size of AV databases makes them less suitable for frequent updates. A method for reducing a size of the AV database is desired.

A tendency of rapid increasing of the AV databases is a problem that is already critical for producers of the AV systems. It is desired to make the AV databases more convenient and mobile. Update of AV applications based on various parameters is disclosed in publications WO2010024606A2 and KR2009111152A.

WO2010024606A2 discloses a system and method for selection of data for computers based on an operating system and a version of an AV application used. KR2009111152A describes a system for updating AV systems. The system is based on classification of the files that need to be checked and generating a list of required updates.

These systems have some disadvantages. For example, the AV databases are generated manually based on a limited list of parameters. The AV database is created without taking into account overall security needs of a user, apart from checking the user files. U.S. Pat. No. 7,743,419 discloses a method for preventing computer virus epidemics. The method is based on collecting user PC information and analyzing it for signs of an epidemic. The epidemics can be predicted and prevented.

Accordingly, there is a need in the art for a system for dynamic generation of the AV databases based on parameters of a user computer without affecting the effectiveness of malware detection system that uses the AV database.

SUMMARY OF THE INVENTION

The present invention is related to methods for anti-virus (AV) protection. The present invention provides a method, system and computer program product for dynamic generation of AV databases based on parameters of a user computer that substantially obviates one or several of the disadvantages of the related art.

In one aspect of the invention, a method for reducing the size of the AV database by dynamically generating an AV database according to user parameters is provided. According to an exemplary embodiment, critical user parameters that affect the content of the AV database required for this user are determined. The AV database for the single user is generated based on the user parameters. When the parameters of the user computer change or when new malware threats are detected, the user AV database is dynamically updated according to the new parameters and the new malware threats.

The update procedure becomes more efficient, since a need of updating large volumes of data is eliminated. The AV system, working with a small AV database, finds malware objects more efficiently and uses fewer computer system resources.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to an exemplary embodiment, a method and system for reducing the size of the AV database by dynamically generating an AV database according to user parameters are provided. The critical user parameters that affect the content of the AV database required for this user are determined. The AV database for the individual user is generated based on the user parameters. When the parameters of the user computer change or when new malware threats are detected, the user AV database is dynamically updated according to the new parameters and the new malware threats.

All of the known malware objects (such as, for example, computer viruses, Trojans, worms, rootkits, etc.) along with some new objects can be detected by the AV systems. However, a user, who has an AV application running on his computer, does not need a full AV database that includes a large number of objects the user is likely to never come across. For example, user side AV database does not need to be updated with a blacklist of the web sites from one domain area, while the user only visits another (different) domain and never visits the sites from the first domain.

Furthermore, user PCs have different version of OSs running on them. Different OS versions have different types of malware threats. Thus, using the AV database generated for a specific OS is more efficient as opposed to a universal AV database that works with all OSs and contains large volumes of unnecessary and redundant information. The preferred embodiment addresses these issues by generating an AV database specifically for a particular user computer based on the parameters of this computer.

Figure 1:
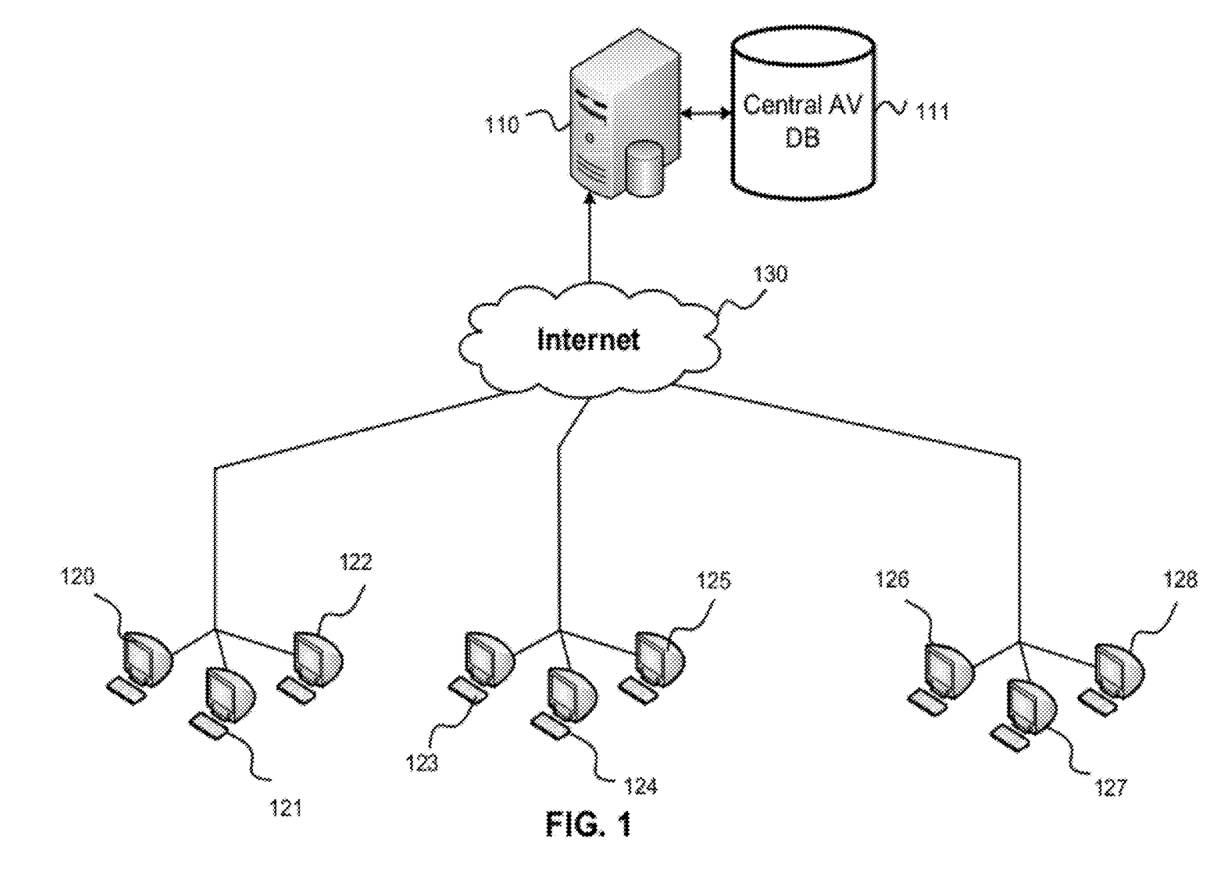
FIG. 1 illustrates a general arrangement of a plurality of user computers, a server and an AV database, in accordance with the exemplary embodiment.

FIG. 1 illustrates a general arrangement of a plurality of user computers, a server and an AV database, in accordance with the exemplary embodiment. Each of user PCs 120-128 has a set of parameters that affect AV databases generated for each user. These parameters are discussed in more detail below. Each of the user PCs 120-128 has its own AV database. If some of the user computers have the same parameters, the AV databases for these computers contain the same data. The AV databases for the computers having different parameters contain different data. However, these databases can have some of the same data as well.

The AV databases 120-128 are formed based on information that is normally stored in the central database 111. If the user computers have similar or the same characteristics, then their AV databases would be the same or similar. If some of the user computer parameters are similar, then the portions of the databases based on those parameters would be the same.

In the exemplary embodiment, server-to-client access is implemented over Internet 130 connections. The update server 110 generates AV databases for each user using a server AV database 111. The parameters of each PC determine the content of the AV database generated for this PC. The update server 110 can update each AV database when the parameters of the corresponding PC change. The server AV database 111 contains data required for functionality of the AV systems running on each of the user PCs having an arbitrary parameter set. Note that the server AV database 111 has a size that is significantly larger than the size of a given user side AV database, because it contains all currently known malware-related data.

Figure 2:
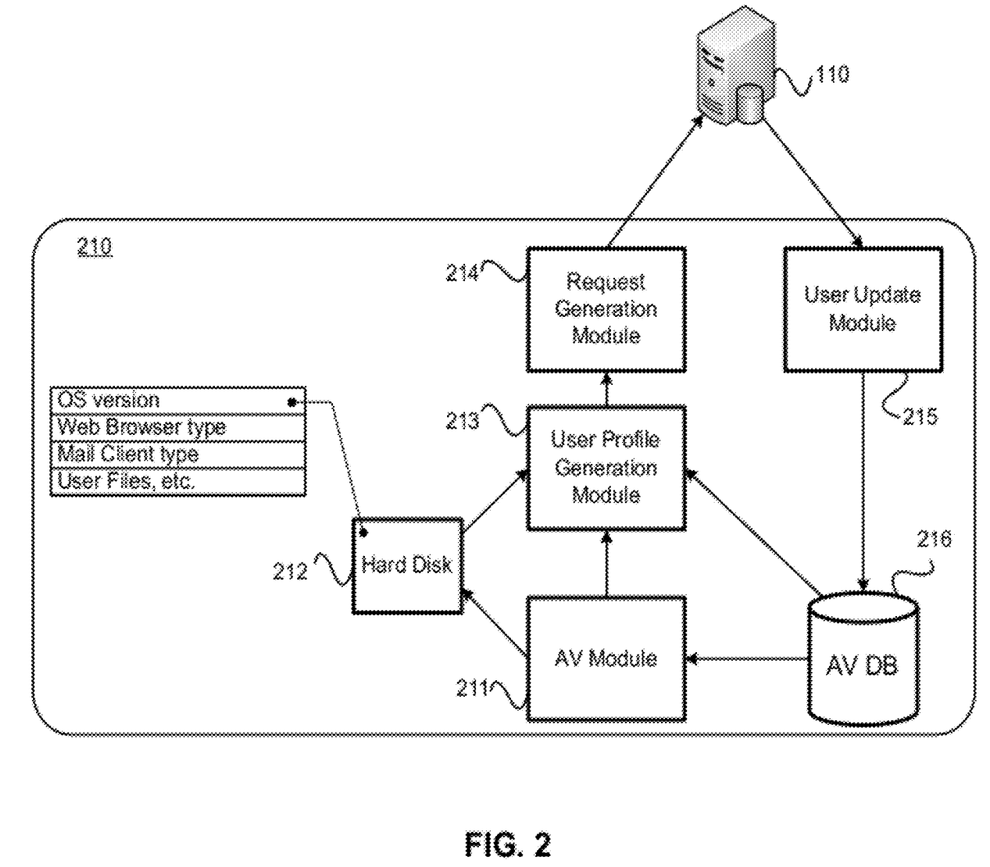
FIG. 2 illustrates a client side of a system dynamic update of AV database, in accordance with the exemplary embodiment.

FIG. 2 illustrates a user side of a system, in accordance with the exemplary embodiment. According to the exemplary embodiment, a user PC 210 includes an AV module 211 that scans a hard disk 212 for malware objects. The AV module 211 is supported by a user side AV database 216. The hard disk 212 stores, for example, a system OS, a web browser, a mail client and other user files. The user PC 210 also includes a user profile generation module 213. The module 213 collects parameters necessary for generating the user profile. The parameters contain at least the following:

- a user ID (a unique number);
- a user location (i.e., a geographical location—a country, or a region including several countries);
- a user computer information (OS version; locality parameters—user language, country, time zone, etc.; web browser type; mail client type, etc.);
- an AV application version;
- an AV database version;
- visited sites statistics;
- detected malware objects statistics.

Additionally, a list of user applications (that can be used by malware) can be used as a parameter. This information is taken into consideration in order to generate the AV database 216 that optimally fits the needs of the user 210, who runs a particular set of the applications. The user parameter data is used by the update server 110 as criteria for generating the AV database 216.

For example, user location may be used to form the signatures database, since the signatures database may be country-dependent, or language-dependent, etc.

A user computer information, which includes data about the installed OS, applications, and so on, since malware often targets specific vulnerabilities in the OS or in the application software, may be used.

Visited sites statistics, which permits determining the types of threats that can appear after visiting particular sites or categories of sites, and which can be taken into account when forming the AV database, may be used.

For example, if several user computers have the same location, same OS version, same web browser, same mail clients, etc., the AV databases generated for these computers are identical. However, the complete content of a particular AV database 216 depends on each particular parameter of the user PC 210. Therefore, a list of the parameters provided above can be augmented by additional parameters reflecting users and their PCs. It is important to come up with a set of the parameters that allows for generating the most optimal AV databases for individual users. Such AV databases provide for maximum user PC protection while having a minimal size possible.

Therefore, the size of the AV database 216 is advantageously reduced by dynamic generation of the AV database based on selected parameters of the user PC 210. The system, in accordance with the exemplary embodiment, provides for additional configurations. For example, if a user PC 210 is uses as a mail server, the user profile generation module 213 can be configured so that the user PC 210 receives only a part of the AV database that is required for detection of viruses and spam in the mail messages. In this case, the AV database 216 will not have the part required for detection of viruses in downloaded web pages. The size of the AV database 216 is reduced accordingly.

In one embodiment, because of resource limitations (i.e., for example, bandwidth limits), the system can configure the user profile generation module 213 so that the AV database receives only the signatures corresponding to the most common malware objects. In this case, the security of the system is minimally reduced, while the size of the AV database 216 is significantly reduced.

The user profile generation module 213 prepares all data to be sent to the update server 110. At an initial registration of the user computer 210 with the update server 110, the user profile generation module 213 collects data required for registration. In order to do this, the user application data and the OS data are retrieved from the hard disk 212. The version of the AV application is also retrieved from the AV module 211. The version of the AV database 216 is determined. All of this data is provided by the user profile generation module 213 to a request generation module 214 that sends a request containing all user information to the update server 110.

Upon initial registration by the user, the user receives the AV database that corresponds to those computer parameters (OS, applications installed, etc.) that the user can provide. Other information can include his location, versions of the OS or the applications, etc. Based on these parameters, the AV database for that user will be generated. Then, the user's computer will provide data to the server regarding visited sites and any identified malware, as well as any changes in the computer's configuration, versions of OS and applications, etc.—in other words, the user's profile on the server will be updated, and the AV database will be updated accordingly. Thus, each user will have an AV database that is optimized for him. In this case, a probability of this AV database being somewhat optimal for the user is rather high. Then, as the data from this user is collected by the update server, the user AV database is continuously modified so ultimately the user is provided with the most optimal AV database.

If the user computer undergoes some changes (for example the OS is updated, new user application is installed, etc.), the changes are detected by the user profile generation module 213 and transferred to the update server 110. Then, the update server 110 updates the user AV database 216 by adding new data that is required for a current parameter set.

The user profile generation module 213 also receives information about detected malware objects from the AV module 211 and transfers this information to the update server 110 via the request generation module 214. The update server 110 collects statistics that are taken in consideration for generating user AV databases. The user PC 210 includes a user update module 215 that receives a new version of the AV database from the update server 110 and updates the user AV database 216.

Figure 3:
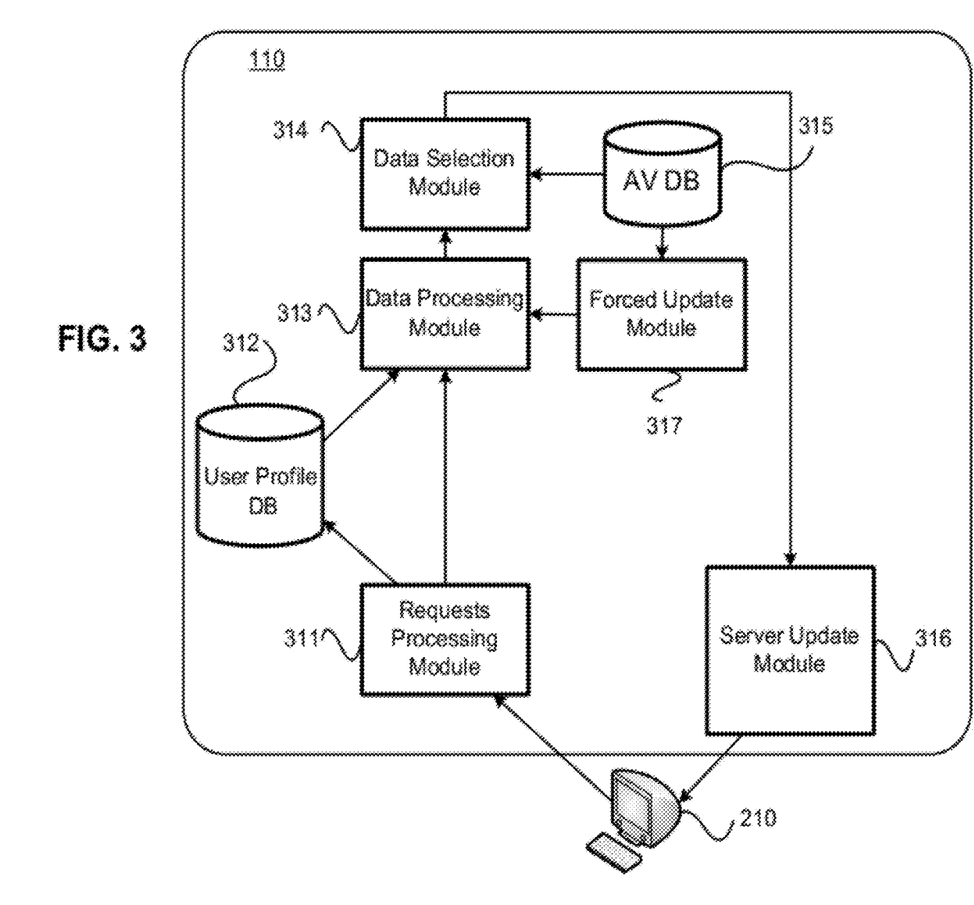
FIG. 3 illustrates a server side of a system for dynamic update of client AV databases, in accordance with the exemplary embodiment.

FIG. 3 illustrates a server side of a system, in accordance with the exemplary embodiment. The update server 110 communicates with user computers via a request processing module 311 that receives user requests from user computers and processes the requests. The request processing module 311 inserts new data contained in the user request into a user profile database 312. The request processing module 311 also informs a data processing module 313 about new user data received.

Alternatively, if a system does not have the user profile database 312, the request processing module 311 transfers the received user data directly to the data processing module 313. The user profile database 312 contains user-related data that is required for speeding up the user data analysis process. The user-related data does not affect a process of generation of the AV database. Therefore, in the alternative embodiments, the user profile database 312 can be absent from the update server 110.

The data processing module 313 analyzes user PC-related data. This analysis includes data related to the detected malware objects. The analysis is performed in cases of planned updates of the user AV database. The analysis can be also performed upon receiving the user request for update of the user AV database. The analysis can also including checking the parameters for each user, where the user-specific database is formed based on the parameters.

If the user AV database needs to be updated, a corresponding request from the user PC is received into the request processing module 311. The data processing module 313 analyzes data from the database 312. Then, based on results of the analysis of the user profiles contained in the user profile database 312, the data processing module 313 generates requirements for the user AV database and provides the requirements to a data selection module 314.

If at least one of the parameters of the user PC has changed, a request containing the data reflecting parameter changes is received into the request processing module 311 and the changed parameter is inserted into the database 312. The data processing module 313 generates new requirements based on the parameter changes. The data selection module 314 receives the requirements from the data processing module 313 and prepares required data by selecting the relevant portions (i.e., a subset of the server AV) from the server AV database 315.

The selected portions of the database 315 are transferred to the user PC 210 by a server update module 316. Then, the user update module 215 receives the selected portions and updates the user AV database 216. Malware objects are periodically modified and new malware objects are created. Therefore, the server AV database 315 also needs to be updated. Some outdated and redundant records need to be deleted from the server AV database 315 as well. Thus, all changes in the server AV database 315 have to be reflected in the user AV databases.

According to the exemplary embodiment, the user AV databases 216 are kept in synch with the server AV database 315 by a forced update module 317. The forced update module 317 sends a notification to the data processing module 313 upon the update of the server AV database 315. Then, the data processing module performs data analysis (out of order) and generates new requirements for the user AV databases 216. Then, the update of the user AV databases 216 is performed as described above.

Figure 4:
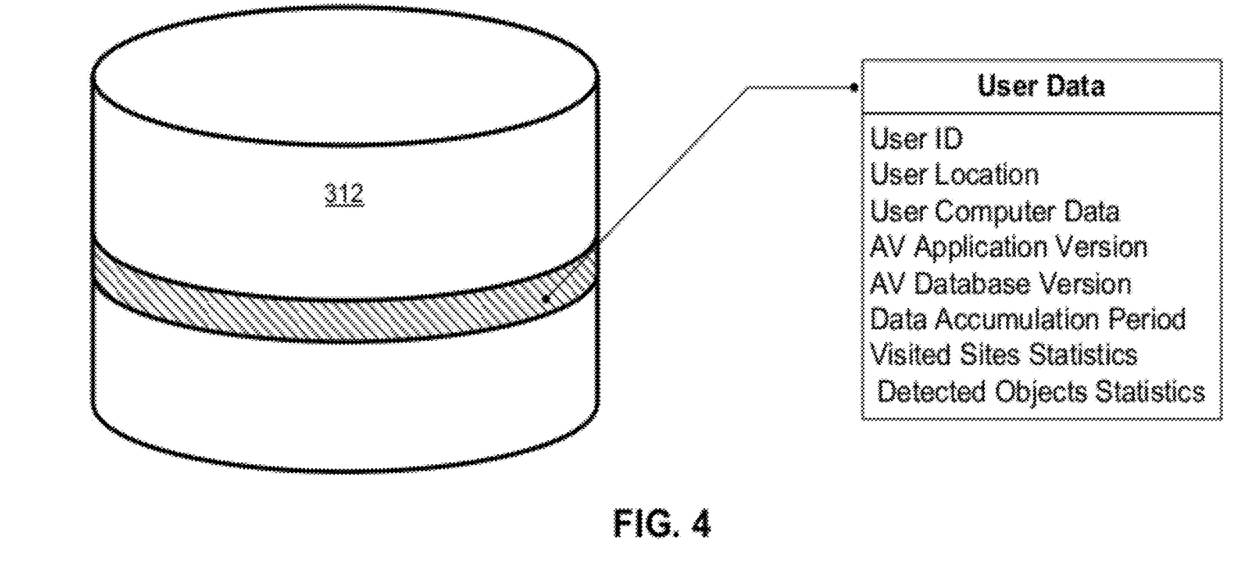
FIG. 4 illustrates a structure of a user profile database, in accordance with the exemplary embodiment.

Data contained in the user profile database 312 is depicted in FIG. 4. Each user has a unique ID (a number or an alphanumeric string). The user profile database 312 contains all data received within user requests, for example: user location; user computer-related data; user AV application version; user AV database version; data accumulation period, visited sites-related statistics; detected malware objects statistics and etc.

Figure 5:
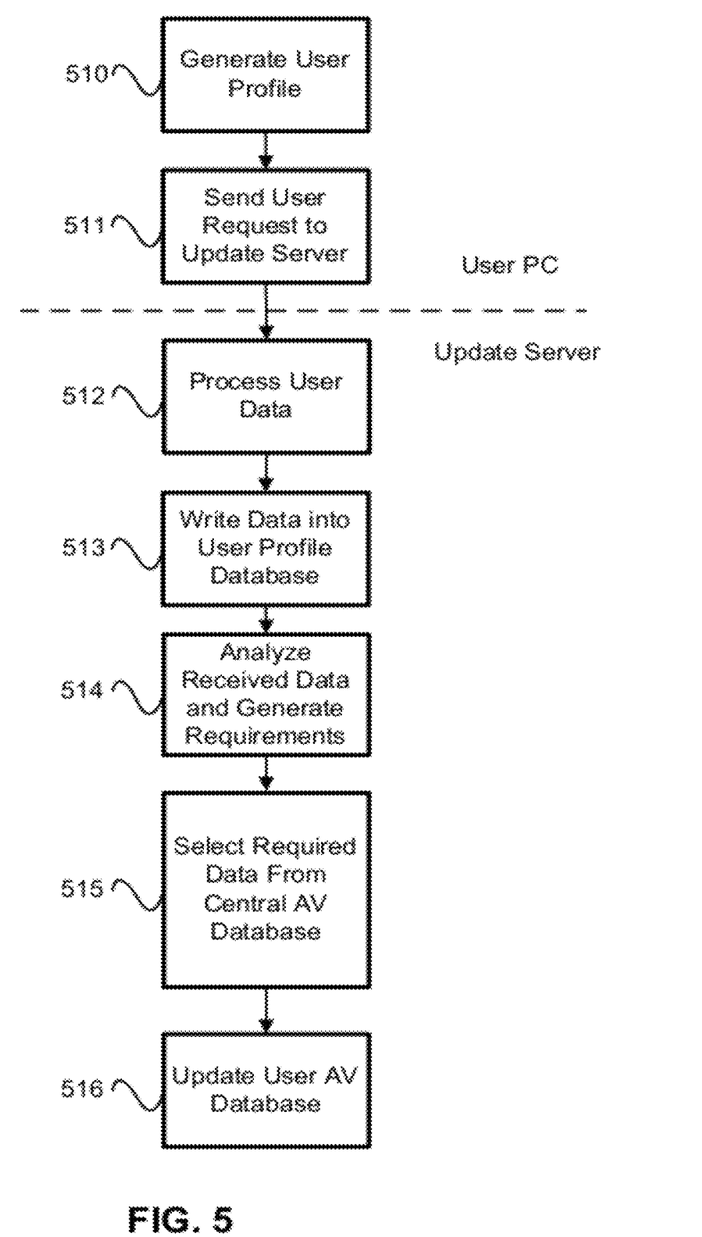
FIG. 5 illustrates a flow chart of a method for dynamic generation of the AV databases, in accordance with the exemplary embodiment.

FIG. 5 illustrates a flow chart of a method for dynamic generation of the AV databases, in accordance with the exemplary embodiment. In step 510 a user profile is formed based on data related to a user computer. A user request containing the user profile information is sent to an update server in step 511. The user request data is processed in step 512 and written into the user profile database in step 513. The user profile data is analyzed in step 514 and new requirements are generated. A relevant data is selected from the server AV database based on the new requirements in step 515. The user AV database is updated in step 516 by the selected data.

Figure 6:
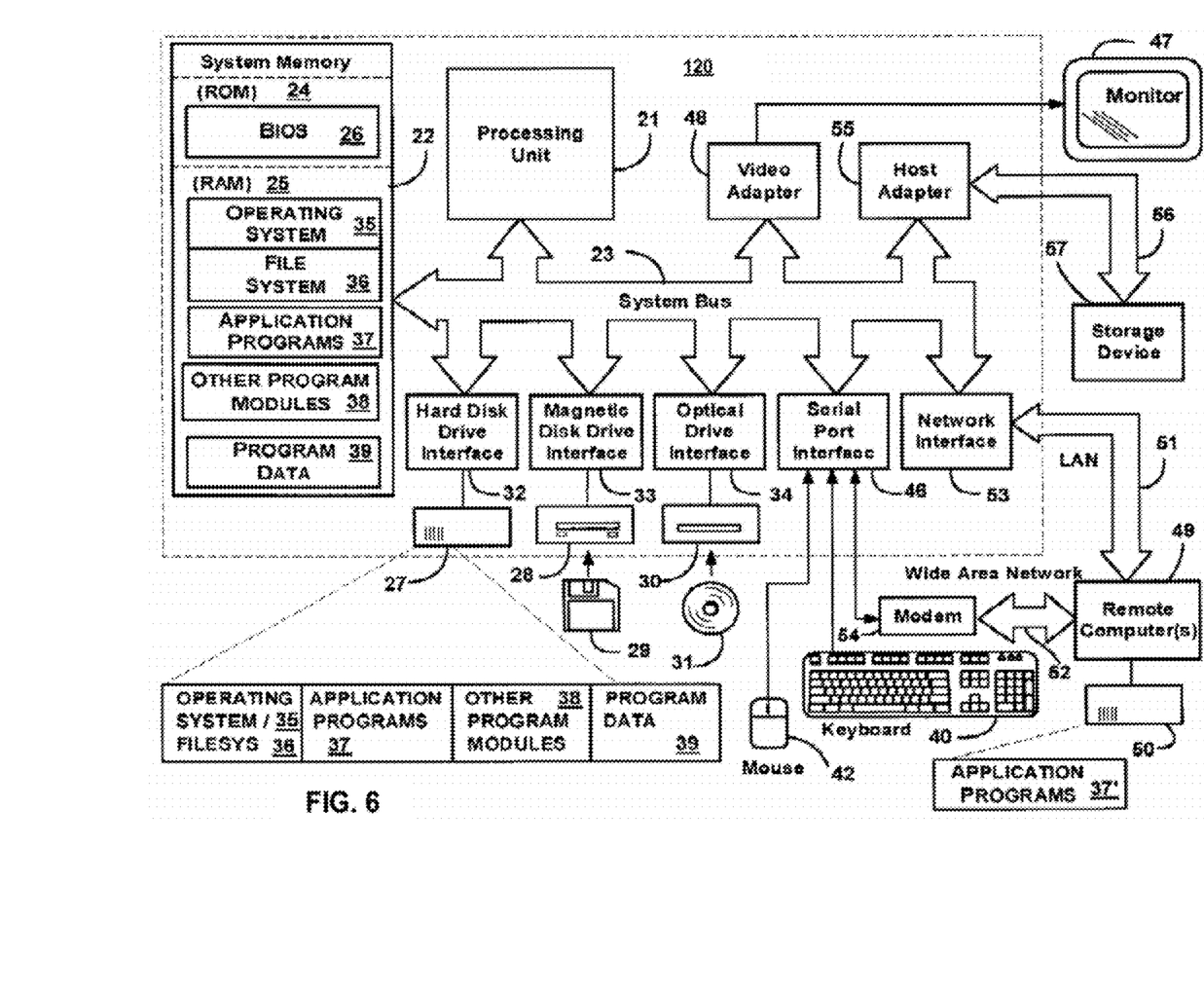
FIG. 6 illustrates a schematic of an exemplary computer system that can be used for implementation of the invention.

With reference to FIG. 6, an exemplary system for implementing the invention includes a general purpose computing device in the form of a computer 120 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 120, such as during start-up, is stored in ROM 24.

The computer 120 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 120.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 120 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 120 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for a reduction of the AV databases by dynamically generating the AV database for the individual users based on user parameters.

It should also be appreciated that various modifications, adaptations and alternative embodiments thereof may be made within the scope and spirit of the present invention. The invention is further defined by the following claims.

What is claimed is:

1. A computer-implemented system for dynamic generation of
    anti-virus (AV) databases, the system comprising:
    a server-side AV database containing data related to known malware objects;
    a hardware server for storing the following software components:
    a request processing component for receiving user requests from a first user computer and processing user parameter data changes of the first user computer contained in the request,
    wherein the user parameter data changes include changes in a user ID, changes in a user location, changes in a user OS version, changes in user applications or changes in user visited sites-related statistics;
    a data processing component for processing the user parameter data changes received from the request processing component and generating user requirements triggered by the user parameter data changes;
    a data selection component for selecting data from the server-side AV database based on the user requirements and generating a subset AV database; and
    a server update component connected to the data selection component for sending the subset AV database to the first user computer for updating a user-side AV database in response to the changes in the user parameter data allowing the first user computer receives the update for its user-side AV database based on the subset AV database on the hardware server when the user parameter data changes occur; and
    an update component coupled to the data processing component for sending a notification to the data processing component when the server-side AV database is updated,
    wherein the data processing component generates the user requirements based on the user parameter data changes in a user profile database connected to the request processing component.

2. The system of claim 1, wherein the user parameter data changes also comprise changes to any of:
    a user AV application version;
    a user-side AV database version;
    a data accumulation period;
    and
    detected malware objects statistics.

3. The system of claim 1, wherein the request processing module is connected to the first user computer.

4. The system of claim 1, wherein the server update module is connected to a user update software module located on the first user computer and the server update module sends the subset AV database to the user update software module.

5. The system of claim 1, wherein the user requests are received from a plurality of user computers and wherein the subsets AV database are send to a plurality of user computers for updating user-side AV databases.

6. The system of claim 1, wherein the server update module provides the subset AV database to the first user computer upon registration.

7. The system of claim 1, wherein the request generation module is connected to the hardware server.

8. A computer-implemented method for dynamic generation of anti-virus (AV) databases, the method comprising:
   receiving user parameter data changes from a first user computer;
   processing the user parameter data changes of the first user computer and generating user requirements in response to the user parameter data changes,
   wherein the user parameter data changes include changes in a user ID, changes in a user location, changes in a user OS version, changes in user applications or changes in user visited sites-related statistics;
   selecting data from an server-side AV database based on the user requirements and in response to the user parameter data changes;
   generating a subset AV database based on the selected data;
   providing the subset AV database to the user for updating a user-side AV database, such that the first user computer receives the update for its user-side AV database based on the subset AV database on the hardware server when the user parameter data changes occur on the first user computer; and
   sending a notification to a data processing component when the server-side AV database is updated,
   wherein the data processing component generates the user requirements based on the user parameter data changes in a user profile database.

9. The method of claim 8, wherein the user parameter data changes also comprise changes to any of:
   a user AV application version;
   a user-side AV database version;
   a data accumulation period;
   and
   detected malware objects statistics.

10. The method of claim 8, further comprising storing the user parameter data changes in the user profile database.

11. The method of claim 8, further comprising detecting updates of the server-side AV database.

12. The method of claim 11, further comprising generating new requirements based the user parameter data changes from the user profile database, generating a new subset AV database based on the new requirements and providing the new subset AV database to the user for updating the user-side AV database.

13. A computer-implemented system for updating a user anti-virus (AV) database, the system comprising:
   a first user computer having a processor and a memory and having the following software components thereon:
   a user-side AV component for scanning a user hard disk drive;
   a user-side AV database accessible by the AV component and containing user-specific data related to known malware objects;
   a user profile generation component for reading user parameter data from the hard disk drive of the first user computer and generating a user profile based on the user parameter data and user parameter data changes of the first user computer,
   wherein the user parameter data changes include changes in a user ID, changes in a user location, changes in a user OS version, changes in user applications or changes in user visited sites-related statistics;
   a request generating component connected to the user profile generation component for generating a request based on the user profile and in response to the user parameter data changes, wherein the request generation component sends the request to a server request processing component;
   a user update component for receiving an update from a server and writing the update to the user-side AV database,
   wherein the user update is generated as a subset of a server-side AV database based on the user profile, such that the first user computer receives the update for its user-side AV database based on the subset AV database on the hardware server when the user parameter data changes occur on the first user computer; and
   an update component coupled to the data processing component for sending a notification to the data processing component when the server-side AV database is updated,
   wherein the data processing component generates the user requirements based on the user parameter data changes in a user profile database connected to the request processing component.

14. The system of claim 13, wherein the user update module receives a new subset of the server-side AV database when the server-side AV database is updated.

15. The system of claim 13, wherein the user parameter data changes are also changes in any of:
   a user AV application version;
   a user-side AV database version;
   a data accumulation period;
   and
   detected malware objects statistics.

16. The system of claim 13, wherein the user update module receives the subset AV database upon registration.

* * * * *